(12) United States Patent
Baatz

(10) Patent No.: US 6,182,601 B1
(45) Date of Patent: Feb. 6, 2001

(54) METER WITH MICROPROCESSOR CONTROL OF POINTER AND MULTI-STATUS INDICATOR

(75) Inventor: Wilfried Baatz, Seattle, WA (US)

(73) Assignee: Floscan Instrument Company, Inc., Seattle, WA (US)

(*) Notice: Under 35 U.S.C. 154(b), the term of this patent shall be extended for 0 days.

(21) Appl. No.: 09/071,651

(22) Filed: May 1, 1998

(51) Int. Cl.[7] .................................................. G01D 11/28
(52) U.S. Cl. .............................. 116/288; 116/300; 362/26
(58) Field of Search ............................... 116/284, 286, 116/287, 288, 296, 302, 304, 305, 300; 362/23, 26, 31, 32, 27, 29, 30, 28; 10/102, 122, 123, 124, 127

(56) References Cited

U.S. PATENT DOCUMENTS

| | | | |
|---|---|---|---|
| 2,831,453 | * 4/1958 | Hardesty | 116/288 |
| 4,380,043 | * 4/1983 | Takamatsu et al. | 362/26 |
| 4,625,262 | * 11/1986 | Sakakibara et al. | 362/30 |
| 4,860,170 | * 8/1989 | Sakakibara et al. | 116/288 |
| 5,458,082 | * 10/1995 | Cookingham | 116/288 |
| 5,949,346 | * 9/1999 | Suzuki et al. | 116/288 |
| 5,983,827 | * 11/1999 | Cookingham et al. | 116/288 |

FOREIGN PATENT DOCUMENTS

| | | | |
|---|---|---|---|
| 48507 | * 7/1985 | (DE) | 116/288 |
| 295165 | * 12/1988 | (EP) | 116/288 |
| 2687470 | * 8/1993 | (FR) | 116/288 |
| 4-113226 | * 4/1992 | (JP) | 116/286 |

* cited by examiner

Primary Examiner—Andrew H. Hirshfeld
(74) Attorney, Agent, or Firm—Christensen O'Connor Johnson Kindness PLLC

(57) ABSTRACT

A meter (10) for receiving signals from a device and presenting status information according to received signals. A microprocessor (12) generates a status signal regarding the status of connected equipment according to the received signals and a predefined boundary for the presented status information. A nighttime indicator and a daytime indicator on the meter's pointer present status information to a viewer according to the generated status signal. The nighttime indicator includes one or more LED(s) (49), a translucent pointer (46) and an angled light deflecting surface (48) for deflecting light generated by the LED(s) to the clear pointer. The daytime indicator includes a cap (36) over the light deflecting surface and a hole (60) through the cap for allowing LED generated light that passes through the deflecting surface to illuminate to a viewer.

3 Claims, 5 Drawing Sheets

METER WITH MICROPROCESSOR CONTROL OF POINTER AND MULTI-STATUS INDICATOR

FIELD OF THE INVENTION

The present invention relates to display meters, and more particularly to the positive display of meter signal information.

BACKGROUND OF THE INVENTION

Analog meters of the type having a circular dial including a scale on the periphery of the dial and a rotatable pointer located at the center of the dial are widely used throughout the world. Such meters are fairly inexpensive to manufacture and provide clear and accurate indication of the measured information. Since this type of analog meter presents easy to read information for a viewer, these meters become the first place the viewer checks during routine scans of all the instruments. In performing routine checks of all the instruments, it is important to present in an effective manner to the viewer situations in which possible errors may be occurring which require immediate attention by the viewer. For example, if the oil pressure in an engine dropped to zero, the viewer requires the information as soon as possible in order to react quickly to the pending engine failure that may occur.

Some analog meters provide LEDs located behind the surface of the dial at the pointer's pivot position for illuminating the pointer, which is usually composed of a translucent plastic material, through a prism located at one end of the pointer. These LEDs are connected to the signal sent to the analog meter for allowing the LED to react when the signal reaches a level that requires that an error or emergency signal be sent to the viewer. The LEDs react by flashing, thereby presenting a pointer that appears to be blinking with the color light of the LED. This is an effective tool for presenting error conditions to a viewer during low-light or nighttime situations, when the light illuminated by the LED within the pointer is relatively easy for the viewer to see. However, during times when high intensity light is shining on the meter or a glare exists around the meter, usually due to bright sunlight, a viewer may have a difficult time seeing the LED generated light illuminated within the pointer, whether steady or flashing. The LED generated light is "lost" in the background light. Therefore, in these situations, errors or emergencies indicated by the signal information supplied to the meter can go unnoticed for an unduly long period of time. It is important to note that time is a critical element when many errors or emergencies occur.

The present invention is directed to overcoming the foregoing and other disadvantages. More specifically, the present invention is directed to providing an apparatus for positively displaying meter signal information in both normal and abnormal detectable parameter conditions, and at both low and high ambient lighting conditions.

SUMMARY OF THE INVENTION

In accordance with this invention, an analog meter for receiving signals from a device and presenting status information according to received signals is provided. The analog meter includes a generator for generating a status signal regarding the status of connected equipment according to the received signals and a predefined boundary for the presented status information. A nighttime indicator and a daytime indicator on the meter's pointer present status information to a viewer according to the generated status signal at low and high ambient lighting levels. The nighttime indicator includes one or more LEDs, a translucent pointer and an angled light deflecting surface for deflecting light generated by the LEDs to the clear pointer. The daytime indicator includes a cap and a hole through the cap for allowing LED generated light that passes through the deflecting surface to illuminate through the cap.

In accordance with other aspects of this invention, the generator is a microprocessor.

In accordance with still other aspects of this invention, the nighttime indicator includes one or more LEDs, and a translucent pointer that includes a beam-splitting light deflecting surface for deflecting light generated by the LEDs to the clear pointer.

In accordance with yet other aspects of this invention, the daytime indicator includes a cap. The cap includes a hole for allowing light generated by the LEDs that passes through the deflecting surface to illuminate through the cap.

As will be readily appreciated from the foregoing summary, the invention provides an apparatus for positively displaying meter signal information in varying light conditions.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
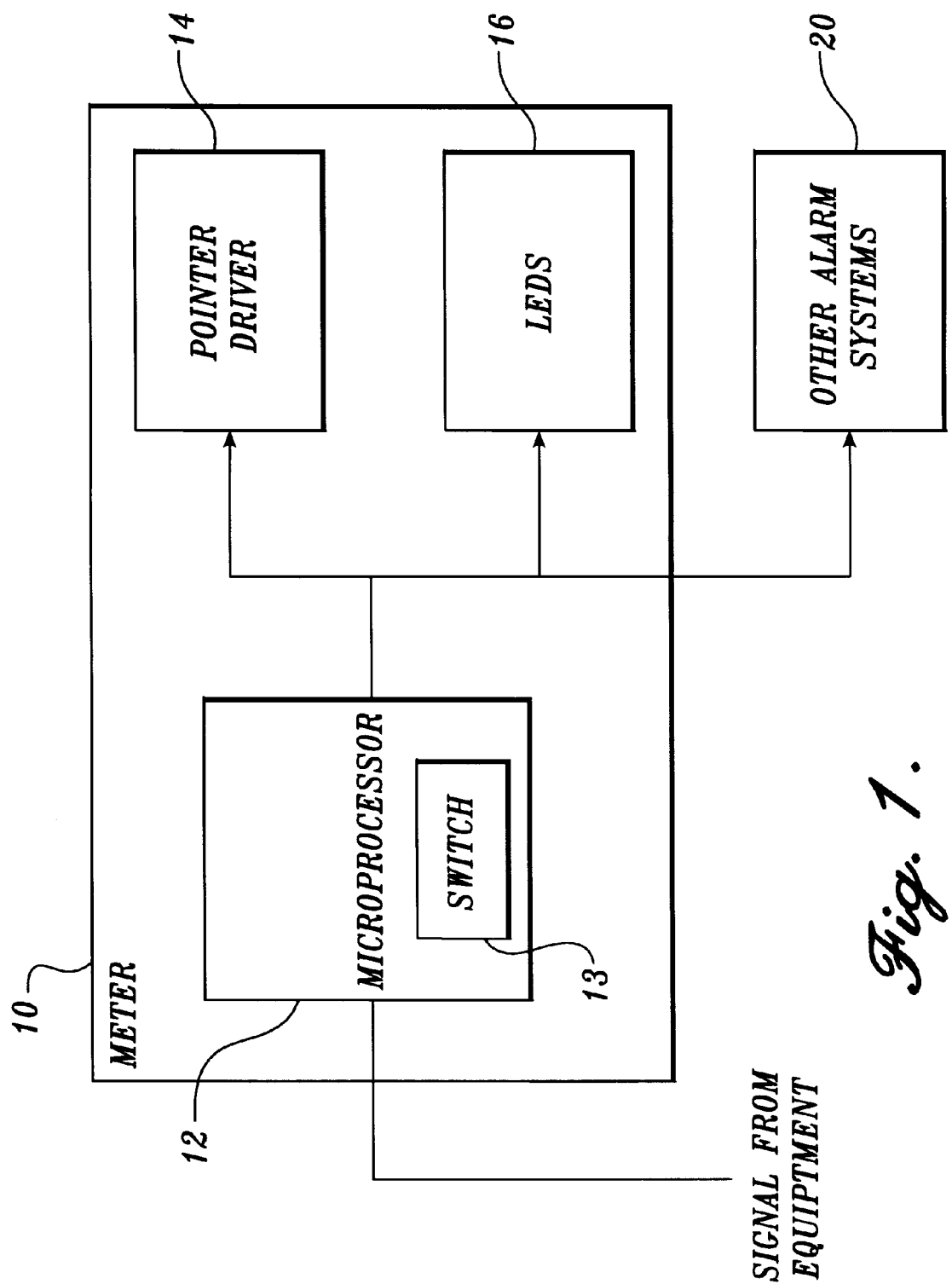
FIG. 1 is a block diagram of a meter and associated attachments formed in accordance with this invention.

FIG. 1 illustrates a meter's components and connections formed in accordance with the present invention. The meter 10 includes a microprocessor 12 with a multi-position switch 13, a pointer driver 14 and LED(s) 16 connected to the microprocessor 12. Microprocessor 12 receives a status signal from the multiposition switch 13 and receives analog or digital signals from sensing equipment being monitored by the meter 10. For example, if the meter is an engine oil pressure gauge, an oil pressure signal is sent to the meter from predefined location(s) on the engine. Other parameters such as temperature, voltage, fuel level, and the speed of engine rotation, by way of non-limiting example, could be monitored. Microprocessor 12 may also connect to other output devices, including other alarm systems 20, such as an onboard audible alarm system.

Microprocessor 12 analyzes the received signals from the respective equipment, which correspond to a sensed parameter, and generates a signal to pointer driver 14. The pointer driver 14 properly deflects a pointer with respect to a scale on meter 10 according to the generated signal. The pointer driver may be an electrical coil assembly, a thermally responsive spring, a servo motor, or other drive mechanism, which causes rotary or linear motion of the pointer. In a preferred embodiment, the pointer driver 14 is an electrical coil assembly that drives a selective degree of rotation of a permanent magnetic core, on which the pointer is disposed. One such suitable drive mechanism is disclosed in U.S. Pat. No. 5,578,918, the disclosure of which is hereby expressly incorporated by reference. The degree of rotation of the pointer corresponds to the magnitude of the sensed parameter.

The multi-position switch 13 is preset to a position relative to the meter's scale. The multi-position switch can be selectively preset to a number of positions by an operator or by the manufacturer of the meter. The microprocessor 12 determines the status of the received signals by comparing them to the preset position(s) of the multi-position switch 13. Then, the microprocessor 12 generates the power signal for the LED(s) according to the determined status. For example, if a received oil pressure signal is below a first preset position, the determined status is low oil pressure and if the oil pressure signal is above a second preset position, the determined status is high oil pressure.

The multi-position switch 13 is also particularly useful if an original part connected to the meter is replaced because of failure or some other reason and the replacement part has specifications different than the original part. In this case the preset position(s) of the multi-position switch 13 are changed in order to adapt the meter to the new specifications. The multi-position switch 13 is preferably a 16-position switch.

During normal operation, when the received signal is within a preset normal operating range as determined by the preset position(s) of the multi-position switch 13, the LED (s) 16 receives a steady power supply from the microprocessor 12. However, when an abnormal situation (received signal above or below preset switch position(s)) is determined by the microprocessor 12 according to the multi-position switch position(s), power is supplied to the LED(s) to cause illumination indicative of the out of tolerance condition. Preferably, the microprocessor 12 provides a pulsating power signal to the LED(s) 16, thereby causing the LED(s) 16 to flash at a predetermined frequency. Using the example above, the microprocessor 12 may generate a power signal at one frequency for the sensed low oil pressure status, a power signal at a second frequency for the determined high oil pressure status and a steady power signal if the received oil pressure signal is between the first and second switch positions.

The signals produced by microprocessor 12 may also be outputted to other alarm systems. For example, if the microprocessor 12 generates a signal indicating an abnormal situation, an audible alarm system remotely located from the meter 10 can be activated according to the generated signal. Any combination of the above alarm conditions or other audio, visual or tactile alarms may be activated. FIGS. 2–5 illustrate the components of meter 10 that allow the LED(s) 16 to be a more effective status indicator.

Figure 2:
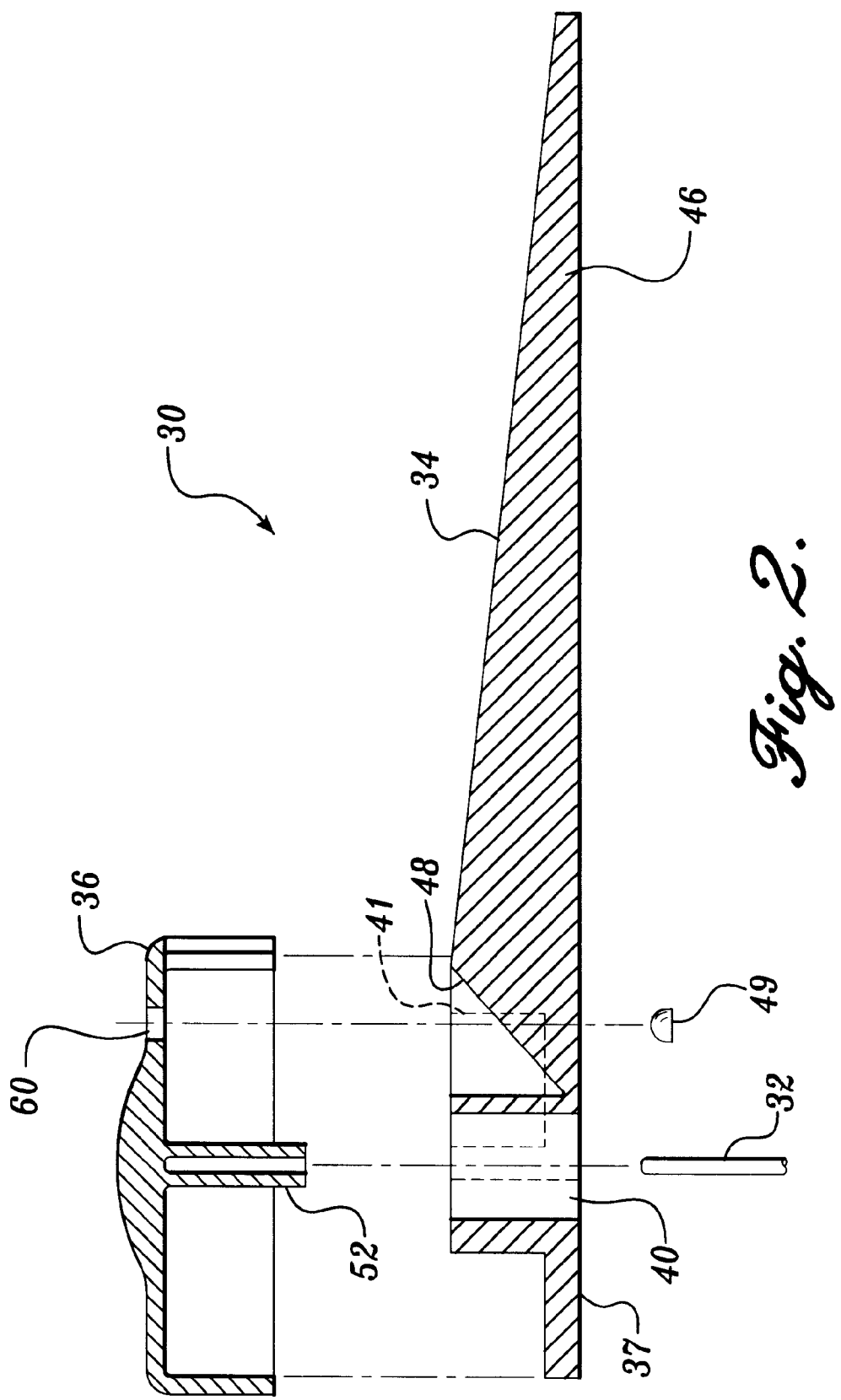
FIG. 2 is a cross-sectional view of the pointer of the present invention.
Figure 3:
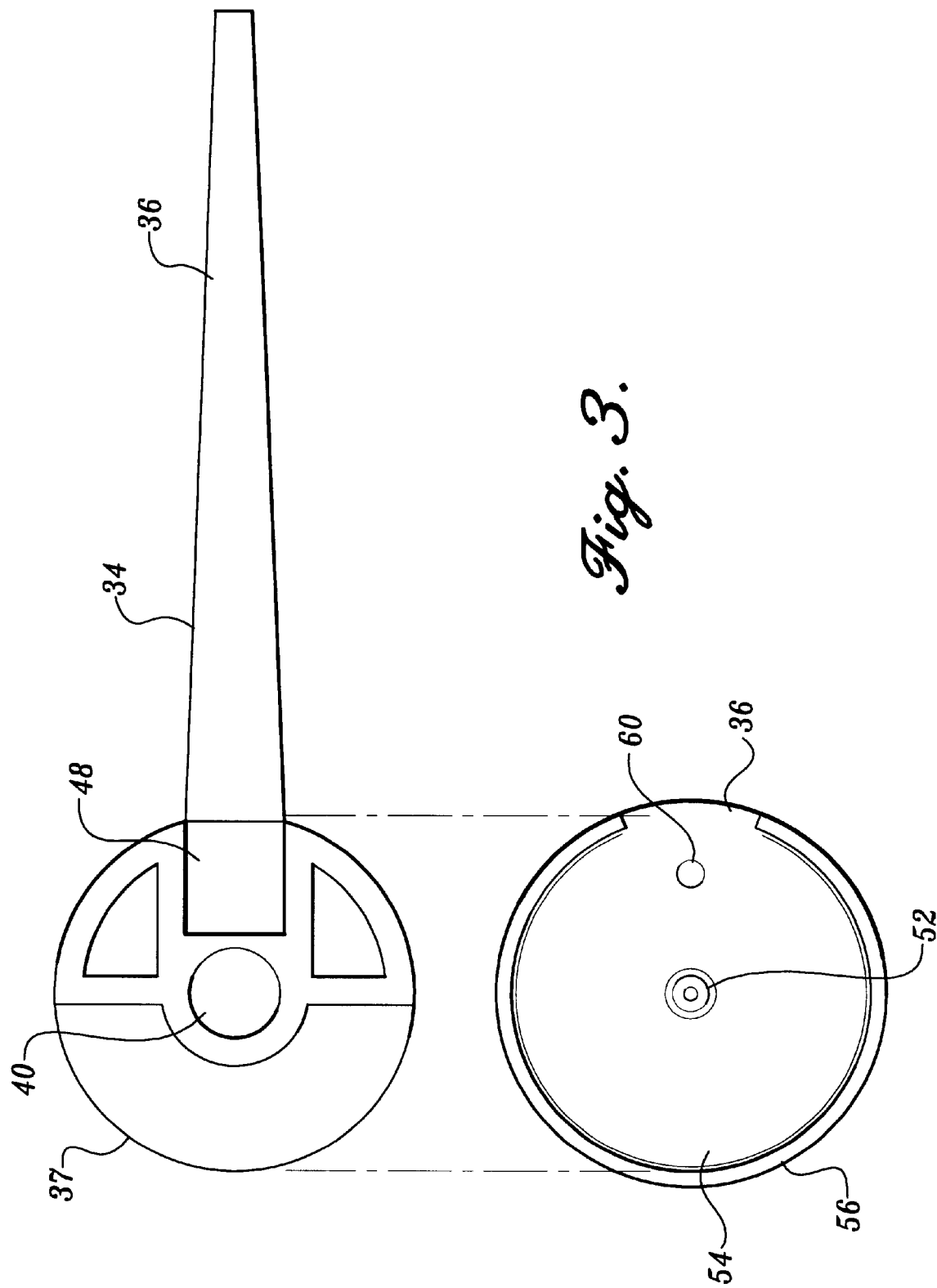
FIG. 3 is a top view of the base and pointer portion of the pointer and a bottom view of a cap portion of the pointer.

As shown in FIGS. 2 and 3, a pointer 30 attaches to the shaft 32 of a pointer driver 14. Pointer 30 includes a base portion 34 and a cap portion 36. The base portion 34 includes a rounded portion 37 with a mounting hole 40 located in its center and a wedge cavity 41 ascending from the base portion's bottom near cavity 40 to the base portion's top side near the outer circumference of the rounded portion 37. The mounting hole 40 extends from a bottom to a top side of the rounded portion 37. The wedge cavity 41 is slightly wider than the mounting hole 40 Extending from the rounded portion 37 at the radial position where the wedge cavity 41 is located is a pointer portion 46. At the connection between the pointer portion 46 and the rounded portion 37, the pointer portion 46 is approximately equal in width to the wedge cavity 41 and extends in height between the top and bottom of the rounded portion 37. The pointer portion 46 extends away from the rounded portion 37 with four orthogonal sides: a top, two sides; and a bottom. The top slopes towards the bottom and the sides slope towards each other as the pointer portion 46 extends away from the rounded portion 37. The cross section of the end of the pointer portion 46 opposite the pointer's connection to the rounded portion 37 is rectangular is shape.

The base portion 34 includes at least a portion, and preferably its entirety, 25 composed of a rigid, translucent (i.e., transparent or clear) plastic material. The bottom surface of the wedge cavity 41 provides an angled light deflector 48. The angled light deflector 48 allows a first predetermined amount of light generated by the LED(s) 49 to pass directly through. It also deflects a second predetermined amount of the LED(s) 49 generated light to illuminate the length of the pointer portion 46. The light deflector 48 thus transmits a first portion of the LED light, and reflects a second portion, serving as a beam splitter or low efficiency prism. When the base portion 34 is properly positioned on shaft 32, the LED 49 is located approximately under the radial center of the angled light deflector 48. The base portion 34 is preferably composed of clear Lexan 141, and is preferably polished to the point where no sink marks exist.

Figure 4:
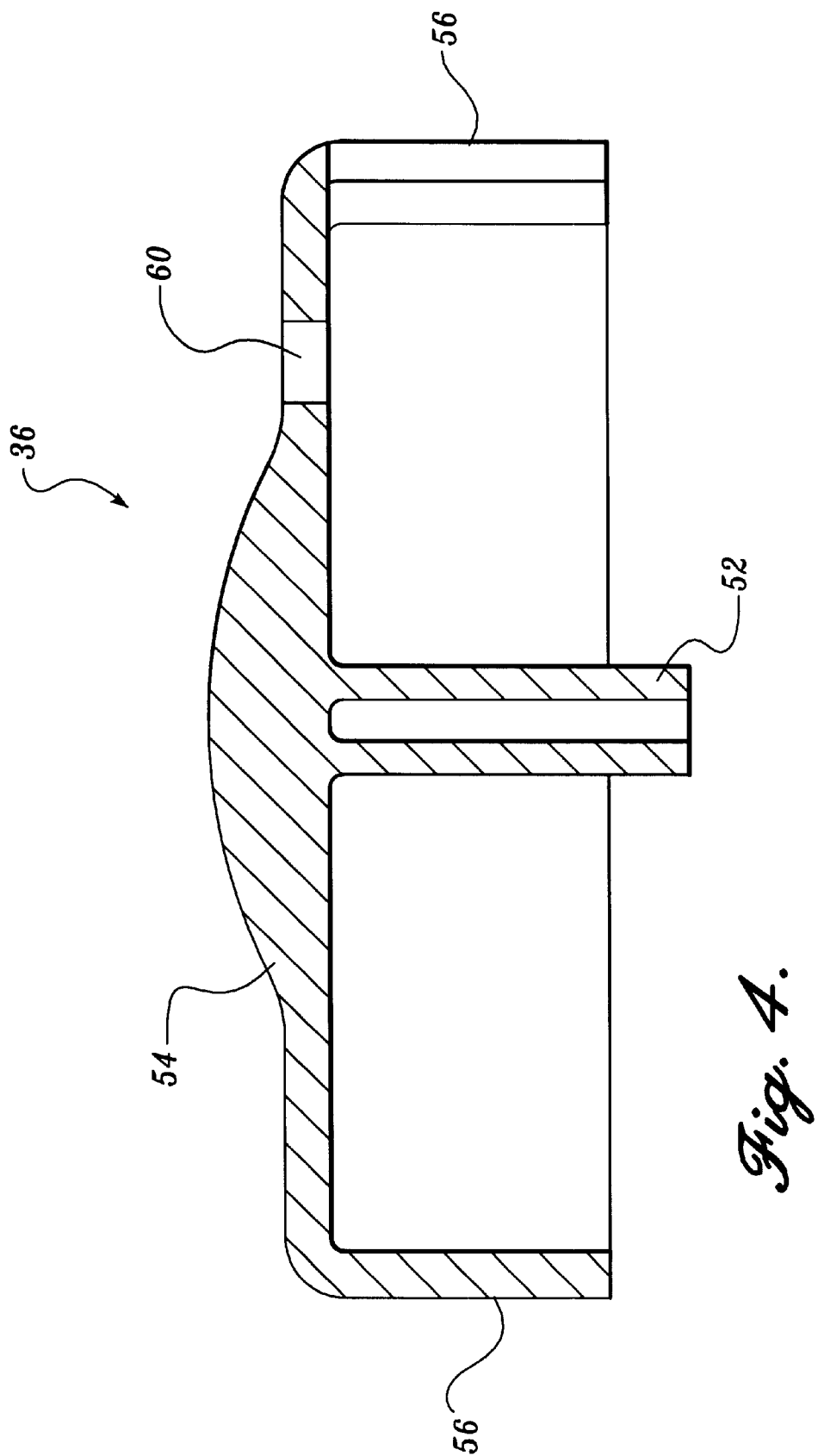
FIG. 4 is a cross-sectional view of the cap portion.

FIGS. 2–5 illustrate the cap portion 36 that attaches to the base portion 34 over the top of rounded portion 37. As shown in FIGS. 3 and 4, cap portion 36 is shaped like an inverted bowl. Cap portion 36 is composed of a top portion 54 that is circular in shape and slightly larger in diameter than that of the rounded portion 37. As shown in FIG. 4, the top portion 54 is slightly peaked at its center. A side wall 56 extends from the outer circumference of the top portion 54, except at the side of the cap portion 36 where the pointer portion 46 attaches to the base portion 34. Also, cap portion 36 includes a shaft receiving sleeve 52 that securably receives shaft 32 from the pointer driver 14. The shaft receiving sleeve 52 attaches at a first unopened end to the underside of top portion 54. Top portion 54 includes an illuminating hole 60 that is large enough to allow LED produced light to escape. When the cap portion 36 mounts to the base portion 34, sleeve 52, which is slightly longer than side wall 56, protrudes through mounting hole 40 out the bottom of rounded portion 37. The base portion 34 is slightly recessed within side wall 56, and illuminating hole 60 is located above angled deflector 48 with a radius from the center of cap portion 36 equal to the distance of LED(s) 49 from shaft 32. Therefore, the LED generated light that passes through the angled light deflector 48 passes directly through the illuminating hole 60. The cap portion 36 is preferably composed of an opaque rigid plastic material.

Figure 5:
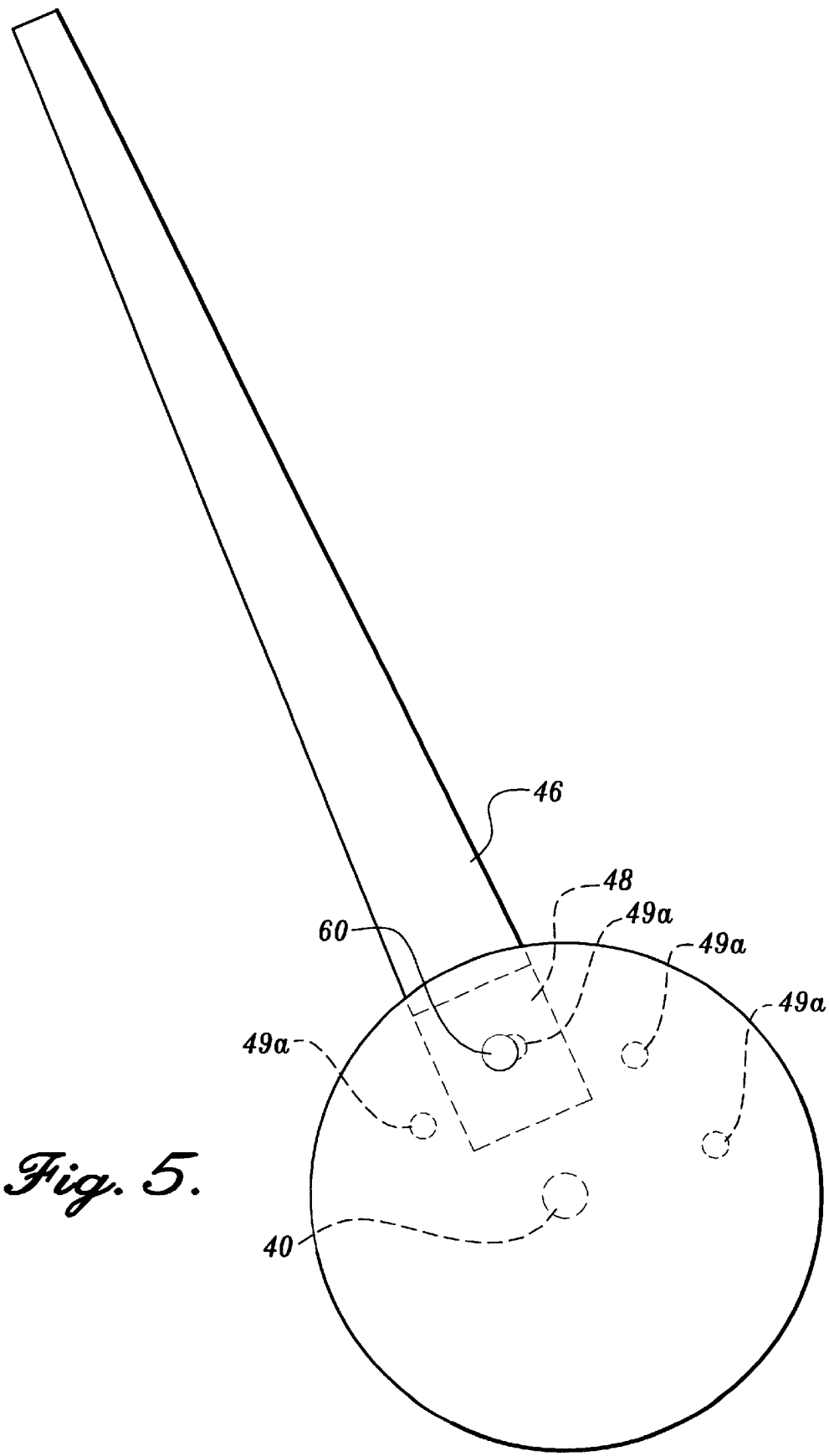
FIG. 5 is a top view of the pointer mounted on a meter.

FIG. 5 is a top plan, magnified view of the pointer 30 connected to a pointer driver 14 and mounted on the face of a meter 10 that includes four LEDs 49a. As described above, the LEDs 49a are mounted on the face of the meter 10 at a distance from the shaft 32 of the pointer driver 14 approximately equal to the distance of illuminating hole 60 from the center of cap portion 36. The LEDs 49a are placed at predefined angular locations in relation to the scale that is displayed on the surface of the meter 10. The LEDs 49a provide illumination to a viewer or operator through illumination hole 60 at all positions of pointer 30 between each end of the meter 10's scale.

According to the components described above, the LED(s) 49 provide status feedback in at least two ways. The first way is that light generated by the LED(S) 49 deflects off angled deflector 48, thereby illuminating the length of pointer portion 46, which thus glows with diffuse light. The second way in which the LED(s) 49 provide status information is through illuminating hole 60, which allows light that passes through angled deflector 48 to pass through cap portion 36 to be observed directly by a viewer. The light deflecting onto the pointer portion 46 is diffuse light and is easily seen at night. However, when a high intensity light such as sunlight is projecting on or near the meter 10, a viewer has a difficult or impossible task of determining if the pointer portion 46 is illuminated and what status is it indicating. Thus, viewer determination of status as shown by the light illuminated through pointer portion 46 would be very difficult to determine without the viewer taking the time to shadow the meter 10 in order to more easily determine its status. The pointer portion 46 cannot alone provide the goal of a meter 10 which is to allow quick and easy equipment status determination in all lighting situations. The LED-generated light that passes through the angled reflector 48 through illuminating hole 60 provides a more intense light indication to the viewer, however, thereby allowing the viewer to quickly determine status in both low intensity lighting conditions, in conjunction with the pointer, and also in high intensity lighting conditions, when the pointer lighting is less visible.

While the preferred embodiment of the invention has been illustrated and described, it will be appreciated that various changes can be made therein without departing from the spirit and scope of the invention.

What is claimed is:

1. A meter for presenting status information of equipment during low and high intensity lighting conditions, said meter comprising;

a controller for generating status information signals according to signals received from the equipment;

a pointer comprising a base portion and an opaque cap, the base portion including a translucent elongate portion and a splitter;

a pointer driver for deflecting the pointer according to the generated status information signals; and at least one LED connected to the controller for generating light according to the generated status information signals for illuminating the pointer for viewing the low and the high intensity lighting conditions, said light being directed to the splitter, wherein a first portion of the light is reflected into the translucent elongate portion and a second portion is passed through said splitter, said cap including an aperture spaced apart from the elongate portion, the aperture allowing the second portion of the light to pass through the cap to permit the aperture to be viewed in the high intensity lighting conditions when the translucent elongate portion is less visible.

2. A dual display meter, for visually displaying status information associated with a monitored condition, comprising:

a processor for generating control signals in response to the status of the monitored condition;

a display pointer movable along a scale corresponding to the status of the monitored condition, the display pointer having spaced apart first and second display portions;

a display driver for controlling movement of the display pointer in accordance with the control signal generated by the processor;

a light emitting source operable to generate light in response to control signal generated by the processor; and a light splitter for splitting the light generated by the light emitting source into first and second portions, said first light portion being directed to said first display portion and said second light portion being directed to said second display portion of the pointer for viewing under first and second ambient lighting conditions, the first display portion having a higher intensity of displayed light than the second display portion to permit the first display portion to be viewed in higher intensity lighting conditions when the second display portion is less visible.

3. The meter of claim 2, wherein the processor generates an alarm signal when the monitored condition meets a predetermined threshold condition, the light emitting source emitting an alarm light level in response to the alarm signal.

* * * * *

UNITED STATES PATENT AND TRADEMARK OFFICE
CERTIFICATE OF CORRECTION

PATENT NO. : 6,182,601 B1
DATED : February 6, 2001
INVENTOR(S) : W. Baatz

Page 1 of 1

It is certified that error appears in the above-identified patent and that said Letters Patent is hereby corrected as shown below:

<u>Column 6, claim 1,</u>
Line 1, "viewing the" should read -- viewing under the --

<u>Column 6, claim 2,</u>
Line 16, "generating control signals" should read -- generating a control signal --

<u>Column 6, claim 2,</u>
Line 27, "to control" should read -- to the control --

Signed and Sealed this

Fifth Day of February, 2002

Attest:

*Attesting Officer*

JAMES E. ROGAN
*Director of the United States Patent and Trademark Office*